United States Patent
Dieckmann et al.

(10) Patent No.: US 11,364,886 B2
(45) Date of Patent: Jun. 21, 2022

(54) METHOD FOR DETERMINING THE OVERALL-DECELERATION VALUES OF A UTILITY VEHICLE THAT ARE ATTAINABLE BY ACTUATION OF WHEEL BRAKES, BRAKING SYSTEM FOR CARRYING OUT THE METHOD, AND UTILITY VEHICLE WITH SUCH A BRAKE SYSTEM

(71) Applicant: WABCO GmbH, Hannover (DE)

(72) Inventors: Thomas Dieckmann, Pattensen (DE);
Stephan Kallenbach, Hannover (DE);
Torsten Wallbaum, Duingen (DE);
Christian Wiehen, Burgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 281 days.

(21) Appl. No.: 16/623,782

(22) PCT Filed: Apr. 24, 2018

(86) PCT No.: PCT/EP2018/060438
§ 371 (c)(1),
(2) Date: Dec. 18, 2019

(87) PCT Pub. No.: WO2018/233907
PCT Pub. Date: Dec. 27, 2018

(65) Prior Publication Data
US 2020/0172063 A1    Jun. 4, 2020

(30) Foreign Application Priority Data
Jun. 20, 2017    (DE) ..................... 10 2017 005 816.4

(51) Int. Cl.
*B60T 8/172*    (2006.01)
*B60T 7/12*    (2006.01)
(Continued)

(52) U.S. Cl.
CPC ............... *B60T 8/172* (2013.01); *B60T 7/12* (2013.01); *B60T 8/1708* (2013.01);
(Continued)

(58) Field of Classification Search
CPC .......... B60T 8/172; B60T 7/12; B60T 8/1708; B60T 8/1766; B60T 8/321; B60T 8/323
(Continued)

(56) References Cited

U.S. PATENT DOCUMENTS 4,934,760 A * 6/1990 Myers ..................... B60T 13/18
188/170
5,090,518 A * 2/1992 Schenk ..................... B60T 8/00
188/157

(Continued)

FOREIGN PATENT DOCUMENTS

| DE | 4321571 A1 * | 1/1994 | ............. B60K 28/10 |
| DE | 19826131 A1 * | 12/1999 | ............. B60T 8/885 |

(Continued)

*Primary Examiner* — Isaac G Smith
(74) *Attorney, Agent, or Firm* — Leydig, Voit & Mayer, Ltd.

(57) ABSTRACT

A method for determining the overall-deceleration values is attainable by actuation of wheel brakes, of a utility vehicle or of a vehicle combination with several axles. For the purpose of implementing a deceleration request in the course of partial brake applications, a braking-force distribution with braking forces distributed unequally to brake units with the wheel brakes of one or more axles is undertaken. In each instance one of the brake units is selected and a larger braking force is imposed via this selected brake unit than via the other brake units. A current deceleration of the utility vehicle or of the vehicle combination is measured or ascertained and is assigned as partial-deceleration value to the respectively selected brake unit and stored and the attainable
(Continued)

overall-deceleration values are determined as the sum of the partial-deceleration values of all the brake units.

9 Claims, 3 Drawing Sheets

(51) Int. Cl.
*B60T 8/17* (2006.01)
*B60T 8/1766* (2006.01)
*B60T 8/32* (2006.01)

(52) U.S. Cl.
CPC ............ *B60T 8/1766* (2013.01); *B60T 8/321* (2013.01); *B60T 8/323* (2013.01); *B60T 2201/022* (2013.01); *B60T 2240/02* (2013.01); *B60T 2250/00* (2013.01); *B60T 2270/10* (2013.01)

(58) Field of Classification Search
USPC .......................................................... 701/71
See application file for complete search history.

(56) References Cited

U.S. PATENT DOCUMENTS

| | | | |
|---|---|---|---|
| 8,573,713 B2* | 11/2013 | Jager | ..................... B60T 13/586 |
| | | | 303/151 |
| 10,239,505 B2 | 3/2019 | Boethel et al. | |
| 2013/0297164 A1 | 11/2013 | Lauffer et al. | |
| 2018/0272975 A1* | 9/2018 | Zhu | ..................... G05D 1/0088 |

FOREIGN PATENT DOCUMENTS

| | | |
|---|---|---|
| DE | 102008061944 A1 | 6/2010 |
| DE | 102015006737 A1 | 11/2016 |
| WO | WO 9312962 A1 | 7/1993 |

\* cited by examiner

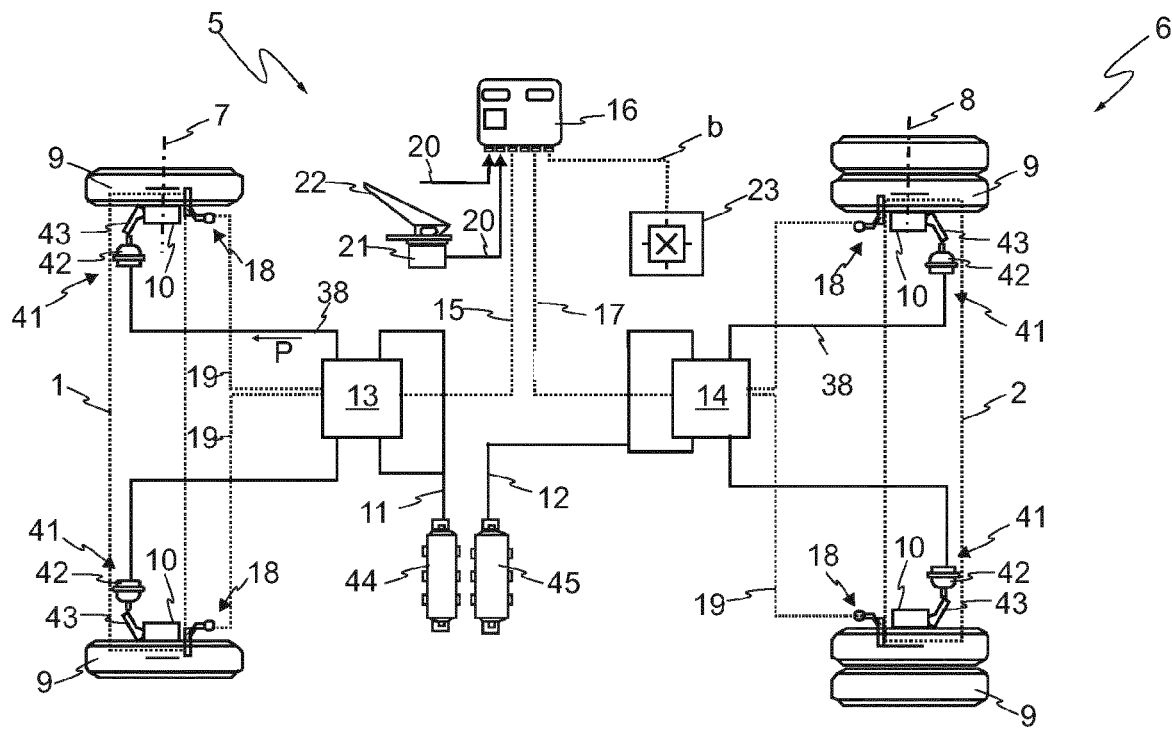
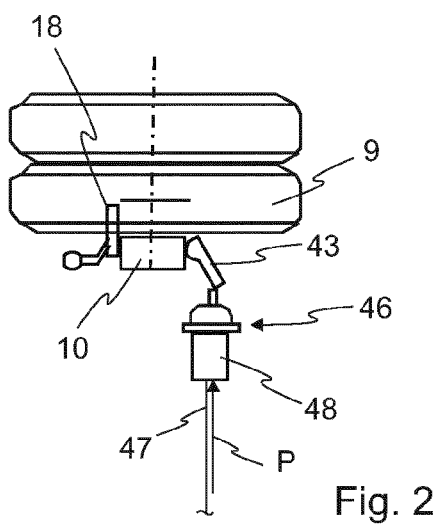
Fig. 2
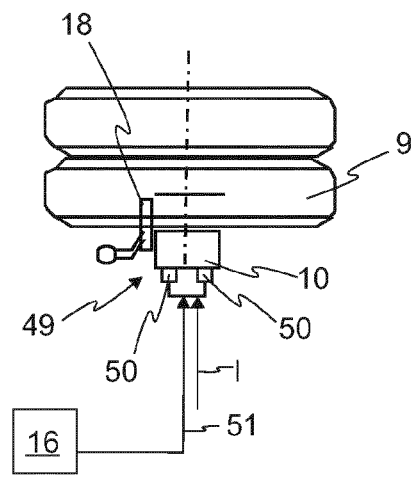
Fig. 3

METHOD FOR DETERMINING THE OVERALL-DECELERATION VALUES OF A UTILITY VEHICLE THAT ARE ATTAINABLE BY ACTUATION OF WHEEL BRAKES, BRAKING SYSTEM FOR CARRYING OUT THE METHOD, AND UTILITY VEHICLE WITH SUCH A BRAKE SYSTEM

CROSS-REFERENCE TO PRIOR APPLICATIONS

This application is a U.S. National Stage Entry under 35 U.S.C. § 371 of International Application No. PCT/EP2018/060438 filed on Apr. 24, 2018, and claims priority to German Patent Application No. DE 10 2017 005 816.4 filed on Jun. 20, 2017. The International Application was published in German on Dec. 27, 2018 as International Publication No. WO 2018/233907 A1 under PCT Article 21(2). The International Application and the International Publication are hereby incorporated by reference herein.

FIELD

Embodiments of the invention relate to a method for determining the overall-deceleration values that are attainable by actuation of wheel brakes for the purpose of decelerating a utility vehicle including a vehicle combination with several axles.

BACKGROUND

DE 10 2008 061 944 A1 discloses a method for ascertaining accurate brake characteristics that are drawn upon for the purpose of determining the respective response pressure of a brake. With the brake characteristics, the control effort for correcting the applied brake pressure at a respective brake is intended to be reduced. In the known method, after detection of a braking request the brake pressure at the brakes of a first axle is changed, whereas at all the brakes of the other axles the brake pressure is kept constant or no brake pressure is applied. In addition, a motion characteristic is detected which indicates a deceleration of a towing vehicle or of a vehicle train. From the motion characteristic and also the brake pressure at the brakes of the first axle, a brake characteristic is calculated, where appropriate taking the current brake temperature into consideration.

SUMMARY

In an embodiment, the present invention provides a method for determining the overall-deceleration values, attainable by actuation of wheel brakes, of a utility vehicle or of a vehicle combination with several axles. For the purpose of implementing a deceleration request in the course of partial brake applications, a braking-force distribution with braking forces distributed unequally to brake units with the wheel brakes of one or more axles is undertaken. In each instance one of the brake units is selected and a larger braking force is imposed via this selected brake unit than via the other brake units. A current deceleration of the utility vehicle or of the vehicle combination is measured or ascertained and is assigned as partial-deceleration value to the respectively selected brake unit and stored and the attainable overall-deceleration values are determined as the sum of the partial-deceleration values of all the brake units.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a pneumatic and electrical diagram of a braking system of a utility vehicle, according to an embodiment.

FIG. 2 is a schematic view of a second embodiment example with a hydraulic actuating system, according to an embodiment.

FIG. 3 is a schematic view of a third embodiment example with an electromechanical actuating system, according to an embodiment.

DETAILED DESCRIPTION

Figure 4:
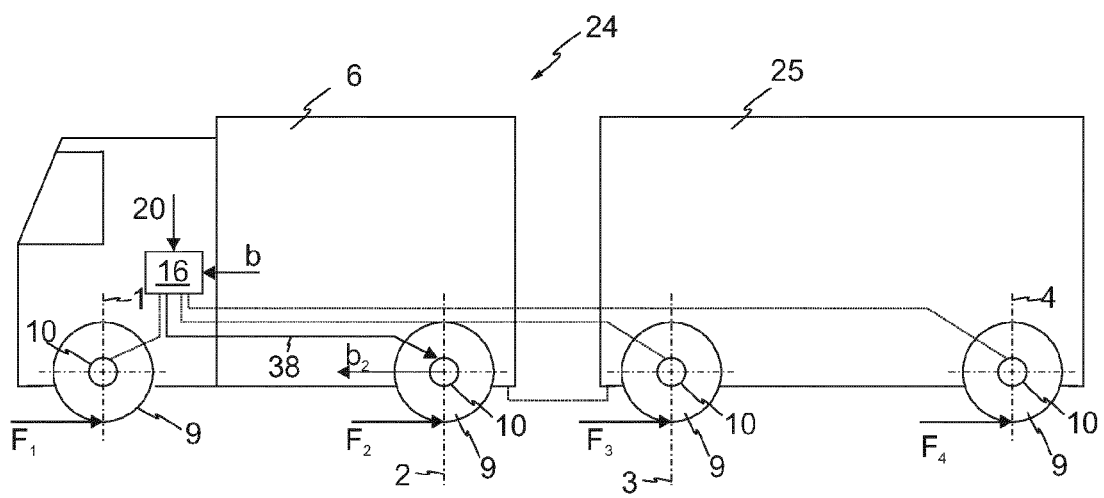
FIG. 4 is a schematic representation of the deceleration and of the braking forces in respect of a vehicle combination with several axles, according to an embodiment.

Automated braking systems—for instance, advanced emergency braking systems (AEBS), driver-assistance systems such as electronic stability control systems (ESC)—are increasingly being employed in modern utility vehicles, wherein the braking system decelerates the vehicle in automated manner as necessary via an electronic brake control unit, independently of brake applications by the driver. Of particular significance in this regard is the most accurate knowledge possible of the overall deceleration of the utility vehicle that is attainable by actuation of the wheel brakes. This applies especially to so-called platooning, wherein with the aid of a coordinating control system several utility vehicles or vehicle combinations travel one behind the other in road traffic with the smallest possible separation, in order to reduce the consumption of fuel. The utility vehicles of the platoon have been networked together or exhibit devices for separation measurement, such as radar or lidar, which serve for the setting of distances from the vehicle traveling ahead that are as small as possible, without the safety of traffic being impaired. By reason of short reaction-times of the automated deceleration, the networked utility vehicles in the platoon require a distinctly smaller separation than in the case of manual vehicle guidance, as a result of which the air resistance diminishes considerably.

However, in order to keep the separation as small as possible, as accurate a knowledge as possible of the safety separation needed minimally is required, which depends crucially on the maximally available braking force of a utility vehicle or of a vehicle combination in the platoon. The attainable overall deceleration of a utility vehicle or of a vehicle combination depend on a multitude of factors, for instance the loading-state and the braking forces that are attainable by the wheel brakes. The respective braking force is influenced by the brake characteristic of the wheel brakes, which represents the dependence on the set manipulated variable—for instance, the imposed brake pressure—of the braking torque imposed by the wheel brake. In addition to this brake characteristic, structurally determined properties of individual brakes and also tires, as well as the friction of the roadway, also have an influence on the attainable braking forces.

For the compilation of platoons, it has already been proposed to draw upon the equipment of disk brakes and/or drum brakes as a criterion for the deceleration capacity. However, this is not only technically unfounded, it is also inadequate.

As discussed above, DE 10 2008 061 944 A1 discloses a method for ascertaining accurate brake characteristics that are drawn upon for the purpose of determining the respective response pressure of a brake. With the brake characteristics, the control effort for correcting the applied brake pressure at a respective brake is intended to be reduced. In the known method, after detection of a braking request the brake pressure at the brakes of a first axle is changed, whereas at all the brakes of the other axles the brake pressure is kept constant or no brake pressure is applied. In addition, a motion characteristic is detected which indicates a deceleration of a towing vehicle or of a vehicle train. From the motion characteristic and also the brake pressure at the brakes of the first axle, a brake characteristic is calculated, where appropriate taking the current brake temperature into consideration.

The recording of attained braking forces during the travel of the utility vehicle does not normally provide any reliable information relating to the maximum deceleration, since the implementation of a full brake application would be required for this. Apart from this, a full brake application in public road traffic could cause damage to the cargo or result in an endangering of the vehicle following in the platoon with a short separation, or of other road users.

A measurement of the currently attainable overall-braking forces could, in principle, be ascertained by means of braking tests, but the effort for measuring the attainable overall forces is costly and would have to be carried out frequently, for instance after each change of the loading-state of the utility vehicle or of a vehicle combination. Since this is hardly practicable, the attainable overall-braking forces, in particular the maximally attainable braking force of a utility vehicle or of a vehicle combination, remain unknown. The potential of platooning for reducing the consumption of fuel cannot be exhausted without reliable information relating to the attainable overall-braking forces.

Embodiments of the present invention determine, as accurately as possible during travel, the currently attainable overall-deceleration values for decelerating a utility vehicle or a vehicle combination with several axles.

Embodiments of the present invention include a method for determining the overall-deceleration values, attainable by actuation of wheel brakes, for decelerating a utility vehicle or a vehicle combination with several axles. In addition, embodiments include braking system for carrying out the method and a utility vehicle or a vehicle combination with a braking system of such a type.

In the course of the determination, according to an embodiment of the invention, of the overall-deceleration values that are attainable by actuation of wheel brakes, in the course of partial brake applications partial-deceleration values are determined for individual brake units which are each constituted by the wheel brakes of at least one axle. Brake units with several axles are useful, in particular, when the wheel brakes of several axles are fed from a common brake circuit, or for the purpose of simplifying the distribution of braking force. By "partial brake application" in this connection, a maneuver for decelerating the utility vehicle is understood, in which the magnitude of the requested deceleration of the utility vehicle is less than the maximally attainable deceleration. For the purpose of implementing the deceleration request in the case of partial brake applications, in accordance with an embodiment of the invention a braking-force distribution is undertaken with braking forces distributed unequally to the brake units, wherein in each instance one of the two brake units is selected in time-shifted manner, and a larger braking force is imposed via this selected brake unit than via the other brake units. During the braking process, a current deceleration of the utility vehicle or of the vehicle combination for the braking-force distribution determined in accordance with an embodiment of the invention is measured or ascertained, and is assigned as corresponding partial-deceleration value to the respectively selected brake unit and stored. In this way, a minimally attainable deceleration of the utility vehicle by the selected brake unit is available.

By different brake units for implementing the largest braking force being selected during the travel of the utility vehicle or of the vehicle combination in the course of partial brake applications, partial-deceleration values for all the brake units can be ascertained during travel. The attainable overall-deceleration values are determined as the sum of the partial-deceleration values, determined during travel, of the brake units respectively selected previously for the purpose of determination, according to an embodiment of the invention, of the partial-deceleration values. Expressed differently, the deceleration measured in each instance for the selected brake unit represents the minimally attainable deceleration fraction of the selected axle with respect to the overall deceleration. For the purpose of ascertaining the braking capacity of the utility vehicle or of the vehicle combination, the partial-deceleration values of all the brake units—that is to say, the fractions of the individual brake units with respect to the attainable overall deceleration—are added, and the sum of the partial-deceleration values is determined as the overall-deceleration value.

Advantageously, the brake units are selected in succession for the purpose of implementing the largest braking force in the course of partial brake applications, and the respectively current deceleration is assigned as partial-deceleration value, so that representative partial-deceleration values for all the brake units are available in a short time. The sequence of the selection of the brake units for the purpose of determining the respective partial-deceleration values has been predetermined or, in another advantageous embodiment, is adapted during travel on the basis of the partial-deceleration values ascertained hitherto and the deceleration capabilities, established thereby, of individual brake units. The partial-deceleration values of different brake units are determined in successive partial brake applications or even during the same partial brake application, by different brake units being selected in succession for the purpose of implementing a requested deceleration of the utility vehicle and being employed for the purpose of implementing the respectively largest braking force. Expressed differently, the brake units—that is to say, the axles of the utility vehicle and of any possible trailer vehicle—are acted upon in time-shifted manner in the course of consecutive partial brake applications, or in succession during a sufficiently long braking process.

In order to ascertain the maximally attainable overall deceleration of the utility vehicle or of the vehicle combination by employing all the brake units during travel, respective maximum partial-deceleration values for the individual brake units are determined. The maximum overall-deceleration value is determined as the sum of the maximum partial-deceleration values. For the purpose of determining a maximum partial-deceleration value, a respective slip at the wheel brakes of the selected brake unit is detected and compared with a predetermined slip limit. When the slip limit is reached, the current deceleration of the utility vehicle or of the vehicle combination is stored as maximum partial-deceleration value. The predetermined slip limit is ascertained in advance and is preferably predetermined in accordance with the frictional-connection limit. If the predetermined slip limit—that is to say, the frictional-connection limit—is not reached during the partial braking in respect of the selected axle, the maximum partial-deceleration value is advantageously determined, by the current deceleration of the utility vehicle or of the vehicle combination being weighted in accordance with the detected slip. By the "weighting" in this connection, the evaluation of the slip as influencing variable is understood. In the course of the weighting, a slight slip occurring is evaluated as a large distance from the frictional-connection limit, and the current deceleration is weighted with a corresponding weighting factor, in order to assign a maximum partial-deceleration value for the respectively selected brake unit. In this way, the maximum partial-deceleration value is estimated so as to correspond to the distance from the friction-connection limit on the basis of the actual wheel slip.

Particularly meaningful and accurate partial-deceleration values are obtained if, for the purpose of determining partial-deceleration values, not only the selected brake unit for implementing the largest partial-braking force is employed, but the braking force requested for the purpose of deceleration is concentrated onto the selected brake unit. "Concentration" in this connection is understood to mean that the braking force requested for the purpose of deceleration is imposed as completely as possible by the selected brake unit during the partial brake application—that is to say, the utility vehicle or the vehicle combination is decelerated with single-axle braking during the partial brake application.

In order to ensure that the overall-braking force can be increased as rapidly as possible when required during the ascertainment of partial-deceleration values during a partial brake application, the further brake units are actuated with response force during the concentration of the braking-force distribution onto the selected brake unit.

In a preferred embodiment of the invention, the wheel brakes are actuated pneumatically or hydraulically, the brake pressure being the manipulated variable for imposing the braking force at the respective wheel brake. With a hydraulic actuation of the wheel brakes, high braking torques and braking forces can be set with high precision of adjustment. In another advantageous embodiment, electromagnetic wheel brakes have been provided. In the preferred embodiment, the wheel brakes are put into operation via a pneumatic actuating system, in the course of which powerless maintenance of pressure with constant force is possible and relatively small leakages do not cause environmental pollution. Furthermore, pneumatic braking systems are constructed comparatively simply and in addition are, as a rule, more cost-effective than comparable electromechanical braking systems.

The current deceleration, which is drawn upon for the purpose of determining the partial-deceleration values for the individual brake units, is ascertained from measured values, for instance from the measured values of an acceleration sensor. The acceleration sensor has been assigned to the brake control unit in such a manner that the brake control unit has access to the measured values of the acceleration sensor or receives already evaluated information relating to the current deceleration. In a further embodiment of the invention, measured values of the acceleration sensor of a sensor module are drawn upon for the stability control of the vehicle.

An embodiment of the invention is used particularly advantageously in utility vehicles or in vehicle combinations. By a "utility vehicle" in this connection, a motor vehicle is understood that according to its type of construction is intended for the transportation of goods (for instance, trucks, towing vehicles and such like) or for the transportation of persons (for instance, buses) or for pulling trailers. A vehicle combination comprises a motorized towing vehicle and at least one trailer vehicle.

Taking the overall-deceleration values ascertained in accordance with an embodiment of the invention into consideration, a separation of a utility vehicle or of a vehicle combination from a vehicle traveling ahead is determined. This separation is at least the minimum separation within which the utility vehicle or the vehicle combination with its individual deceleration capacity can, in accordance with the overall-deceleration values, still avoid running into the vehicle traveling ahead. The determination of the separation via the overall-deceleration values ascertained in accordance with an embodiment of the invention during travel allows, particularly in the case of platooning, an optimal setting of as small as possible a sequential separation of the vehicles traveling in the platoon.

FIG. 1 shows an electropneumatic diagram of an electronic braking system 5 of a utility vehicle 6. Electrical lines are represented by dotted lines, and pneumatic lines by solid lines. In the embodiment example shown, the utility vehicle 6 comprises two axles 7, 8, on each of which wheels 9 are arranged on both sides. For the purpose of decelerating (retarding) the utility vehicle 6, a wheel brake 10 has been assigned to each wheel 9. In the embodiment example according to FIG. 1, the braking system 5 exhibits a pneumatic actuating system 41, so that the wheel brakes 10 are capable of being actuated pneumatically and exert a braking force on the revolving wheel 9 in accordance with the applied brake pressure. The pneumatic actuating system 41 includes (e.g., consists of) a pneumatic brake cylinder 42, connected to the wheel brake 10, and also the brake lever 43 and a pressure piston which is arranged in the interior of the wheel brake 10. Under the action of the manipulated variable applied via the control line 38, namely the brake pressure P, the brake cylinder 42 generates an actuating force. The brake lever 43 serves for transmitting and boosting the actuating force generated by the brake cylinder 42.

In the embodiment example shown, the braking system 5 exhibits two brake circuits, a first brake circuit 11 having been assigned to the axle 7 which is situated in front in the direction of travel, and a second brake circuit 12 having been assigned to the rear axle 8. For the purpose of pneumatic actuation of the wheel brakes 10, a first pressure-medium store 44 is arranged in the first brake circuit 11, and a second pressure-medium store 45 is arranged in the second brake circuit 12. The brake circuits 11, 12 include the respective control lines 38 of the wheel brakes 10, via which the wheel brakes 10 are put into operation—that is to say, in the embodiment example with pneumatic wheel brakes 10 that is shown, brake pressure is applied. For the purpose of setting the brake pressure at the wheel brakes 10, in the embodiment example shown an axle modulator 13, 14 has been respectively assigned in both brake circuits 11, 12. A front axle modulator 13 is connected to a brake control unit 16 via a signal line 15. The signal line 15 is, in particular, a CAN connection. Axle modulator 14 is connected to the brake control unit 16 via a signal line 17 (CAN bus).

Speed sensors 18 have been respectively arranged at the wheels 9. The speed sensors 18 of the wheels 9 of the front axle 7 are connected to the front axle modulator 13 in signal-transmitting manner via an electrical line 19. Correspondingly, the speed sensors 18 of the wheels 9 of the rear axle 8 are connected to the rear axle modulator 14. During operation of the braking system 5, the axle modulators 13, 14 register the measured values of the rotational speeds of the respective wheels 9 and send them, where appropriate after evaluation by electronics, to the brake control unit 16. The brake control unit 16 evaluates the ascertained rotational speeds and, where appropriate, adapts the braking force—that is to say, in the embodiment example with pneumatic wheel brakes, the brake pressure—which is predetermined for the respective axle modulator 13, 14. The measured speed values are being used, for instance, for the purpose of realizing an anti-lock function or other stability functions of an electronic braking system. In the course of the evaluation of the rotational speeds, the brake control unit 16 infers the respective wheel slip and the locking tendency of the respective wheel 9. If the braking force corresponding to the applied brake pressure exceeds the maximally transmissible braking force at one or more wheels 9, these begin to lock up, as a result of which the utility vehicle 6 may become unstable. Accordingly, the anti-lock function of the brake control unit 16 monitors the locking tendency of each wheel 9 via the speed sensors 18.

The brake control unit 16 ascertains the braking force and/or the associated brake pressure for the respective wheel brakes 10, corresponding to a deceleration request 20. The brake control unit 16 has been designed to receive external deceleration requests 20, for instance from driver-assistance systems. Particularly in the case of platooning, when several utility vehicles or vehicle combinations have been networked together, the brake control unit 16 receives such braking requests 20 for automated deceleration. In the case of a towing vehicle, in addition a brake-signal generator 21 has been provided, via which the driver of the towing vehicle can make a deceleration request 20 to the brake control unit 16. A brake pedal 22 which is capable of being actuated by the driver and which is arranged in the driver's cab of the utility vehicle has been coupled to the brake-signal generator 21.

A second embodiment example of a braking system exhibits a hydraulic actuating system 46 for the wheel brakes, which is shown in principle in FIG. 2. In this case, via a control line taking the form of a hydraulic line 47 a brake pressure P is switched to a hydraulic cylinder 48 which generates hydraulically an actuating force corresponding to the brake pressure P.

In a third embodiment example of a braking system according to FIG. 3, an electromechanical actuating system 49 has been provided. The actuating system 49 comprises one or more electromechanical actuators 50 which replace the brake piston of a brake cylinder. The brake pads or linings are pressed on—that is, in the case of the disk brake, pressed against the brake disk—by the actuators 50 in accordance with the electrical manipulated variable I applied via the electrical control line 51. The manipulated variable I is ascertained by the brake control unit 16 in a manner analogous to the determination of the brake pressure as manipulated variable in the case of pneumatic operation in the embodiment example according to FIG. 1.

In order to keep the separation from the vehicle traveling ahead as small as possible in the course of platooning, the attainable overall deceleration is determined during the travel of the utility vehicle 6 or of the vehicle combination, and is taken as the basis for the automated deceleration. As elucidated in still more detail below with reference to FIGS. 4 and 5, for the purpose of implementing a deceleration request 20 in the course of partial brake applications a braking-force distribution is undertaken with braking forces distributed unequally to brake units 1, 2 of one or more axles 7, 8. In the embodiment example according to FIG. 1, the wheel brakes 10 of the front axle 7 form such a brake unit 1, whereas brake unit 2 comprises the wheel brakes 10 of the rear axle 8. For the purpose of determining partial-deceleration values for individual brake units 1, 2, the current deceleration b of the utility vehicle 6 (or of the vehicle combination 24 in FIG. 4) is drawn upon. For the purpose of determining the current deceleration b, an acceleration sensor 23 has been assigned to the brake control unit 16. In an alternative embodiment example, the brake control unit 16 determines the current deceleration b from the measured speed values of the speed sensors 18.

Figure 5:
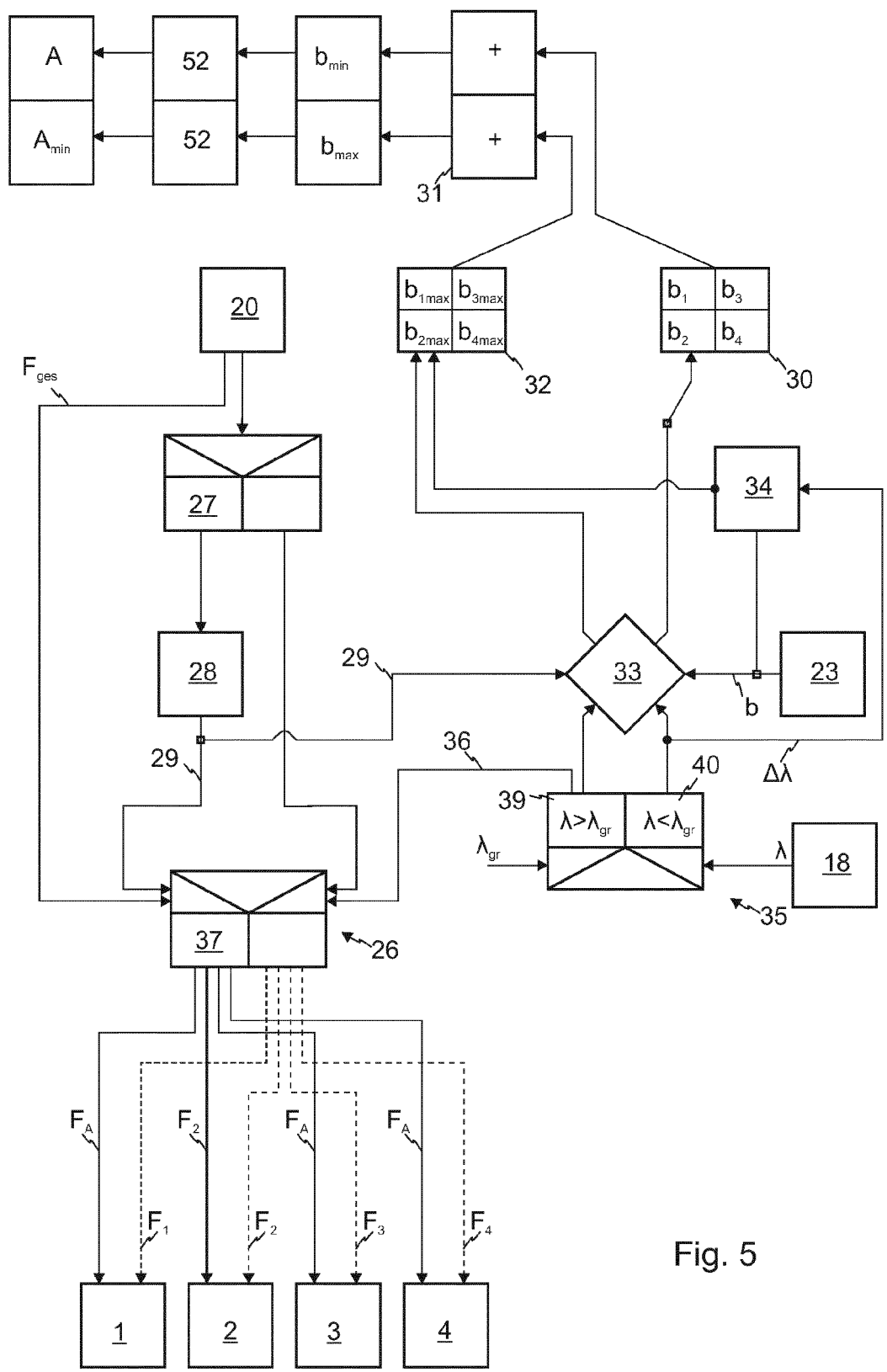
FIG. 5 is a flowchart of an embodiment example of a method for determining the overall-deceleration values of a utility vehicle or of a vehicle combination with the embodiment example of four axles.

In FIG. 4 a vehicle combination 24 is represented which includes (e.g., consists of) a utility vehicle 6, with a first brake unit 1 and a second brake unit 2, and also a trailer vehicle 25 with a third brake unit 3 and a fourth brake unit 4. Each brake unit 1, 2, 3, 4 respectively encompasses the wheel brakes 10 of one axle of the utility vehicle 6 or of the trailer vehicle 25.

The actuation of the wheel brakes 10 is controlled by the control unit 16, so that each brake unit 1, 2, 3, 4 generates a respective braking force $F_1$, $F_2$, $F_3$, $F_4$ as a function of the control by the brake control unit 16.

The brake control unit 16 has been designed to perform a distribution of the braking forces $F_1$, $F_2$, $F_3$, $F_4$ to the brake units 1, 2, 3, 4 in accordance with the deceleration request 20 and the overall-braking force $F_{tot}$ required for implementing this deceleration request. The braking-force distribution 26 is elucidated in more detail below with reference to the flowchart in FIG. 5.

If a partial brake application 27 obtains, this being established with reference to the deceleration request 20 on the basis of a corresponding default or a comparison of the requested overall-braking force $F_{tot}$ with available overall-deceleration values, one of the available brake units 1, 2, 3, 4 is selected, in order to transmit the largest braking force via this brake unit. In FIG. 4 the selection 28 of the second brake unit 2 by a control line 38 represented as a solid line is shown by way of example. The selected brake unit 29 is taken into consideration in the braking-force distribution 26, insofar as a larger braking force is imposed via this selected brake unit 29 than via the other brake units. In the driving situation according to FIG. 4, this means that a larger braking force $F_2$ is transmitted via brake unit 2 than via the remaining brake units 1, 3, 4.

The imposition of the overall-braking force $F_{tot}$ is preferentially concentrated onto the selected brake unit 29 in such a manner that the overall-braking force $F_{tot}$ is imposed completely, or at least quite predominantly, by the selected brake unit 29. In the course of the concentration 37 of the requested overall-braking force $F_{tot}$ onto a selected brake unit 29—in the example according to FIG. 5, with selection 28 of the second brake unit 2—a braking force $F_2$ corresponding to the overall-braking force $F_{tot}$ is imposed, whereas the other brake units 1, 3, 4 are not actuated or are actuated with response force $F_A$. In the preferred embodiment example with pneumatic wheel brakes, the wheel brakes of the remaining brake units 1, 3, 4—that is to say, the brake units not selected—are operated with response pressure, so that, when required, a rapid braking action is possible by increasing the braking forces at these remaining brake units 1, 3, 4.

During travel, the current deceleration b of the vehicle combination 24—that is to say, the joint deceleration of all the vehicles of the vehicle combination 24—is determined via the acceleration sensor 23 (FIG. 1, FIG. 4), and the value of the deceleration b determined in this way is assigned as partial-deceleration value $b_2$ to the selected brake unit 29. In the shown embodiment example of the selection 28 of the second brake unit 2, the current deceleration b is assigned to this brake unit 2 as partial-deceleration value $b_2$. The brake units 1, 2, 3, 4 are selected in succession for the purpose of implementing the largest braking force in the course of partial brake applications 27, and a partial-deceleration value $b_1$, $b_2$, $b_3$, $b_4$ corresponding to the current deceleration b obtaining in the given case is respectively assigned to them. In the course of the assignment 33, the selected brake unit 29 and the current deceleration b are consequently taken into consideration in each instance, so that in the course of the assignment processes following in succession in the course of partial brake applications 27 a partial-deceleration value $b_1$ is assigned to the first brake unit 1, a partial-deceleration value $b_2$ is assigned to the second brake unit 2, a partial-deceleration value $b_3$ is assigned to the third brake unit 3, and a partial-deceleration value $b_4$ is assigned to the fourth brake unit 4. The ascertainment of the partial-deceleration values $b_1$, $b_2$, $b_3$, $b_4$ undertaken one after another and with sufficiently long duration of a partial brake application within the same partial brake application. The partial-deceleration values $b_1$, $2_2$, $b_3$, $b_4$ consequently represent the minimum deceleration capacity that is available via the respective brake unit 1, 2, 3, 4. The partial-deceleration values $b_1$, $b_2$, $b_3$, $b_4$ are stored in a first table of values 30 and are constantly updated during travel.

A minimum overall-deceleration value $b_{min}$ is determined as the sum 31 of the partial-deceleration values $b_1$, $b_2$, $b_3$, $b_4$. The minimum overall-deceleration value $b_{min}$ represents the at least attainable deceleration capacity of the entire vehicle combination 24.

A maximum partial-deceleration value $b_{1max}$, $b_{2max}$, $b_{3max}$, $b_{4max}$ is determined, by a respective wheel slip λ at the wheel brakes 10 of the selected brake unit 29 being detected and compared with a predetermined wheel-slip limit $\lambda_{lim}$ (comparison 35). The wheel-slip limit $\lambda_{lim}$ is predetermined in accordance with the frictional-connection limit. The wheel slip λ is available via the evaluation of the measured speed values of the speed sensors 18 (FIG. 1). When the wheel-slip limit $\lambda_{lim}$ is reached or exceeded 39, the current deceleration b measured at this time is stored as maximum partial-deceleration value $b_{1max}$, $b_{2max}$, $b_{3max}$, $b_{4max}$ in a second table of values 32 for the maximum partial-deceleration values. The maximum partial-deceleration values, which are ascertained in the region of the frictional-connection limit, represent the partial deceleration that is maximally attainable by the respectively selected brake unit. If, as shown in the representation in FIG. 5, the second brake unit 2 is determined as selected brake unit 29, for this second brake unit the current deceleration b is stored, in a manner analogous to the procedure when determining the minimum partial-deceleration values $b_1$, $b_2$, $b_3$, $b_4$, as maximum partial-deceleration value $b_{2max}$ for the second brake unit 2. By formation of the sum 31 of the maximum partial-deceleration values $b_{1max}$, $b_{2max}$, $b_{3max}$, $b_{4max}$, a maximum overall-deceleration value $b_{max}$ for the entire vehicle combination 24 is determined. In this way, a minimum overall-deceleration value $b_{min}$ and a maximally attainable overall-deceleration value $b_{max}$ are available as information which is drawn upon in the course of the control of the sequential separation within the context of platooning.

If in the course of the comparison 35 of the detected wheel slip λ with the predetermined wheel-slip limit $\lambda_{lim}$ it is shown that the wheel slip λ exceeds the wheel-slip limit $\lambda_{lim}$ (exceeding 39), the determination of the partial-deceleration values for the selected brake unit 29 is terminated, and a braking-force distribution 26 with at least one other of the hitherto inactive brake units 1, 3, 4 is undertaken. In this case, an auxiliary braking signal 36 is generated on the basis of the comparison 35, so that in the course of the braking-force distribution 26 an auxiliary braking—that is to say, an additional actuation of at least one of the brake units 1, 3, 4 not actuated hitherto—is undertaken. Given correspondingly high deceleration demand, the increased braking force is imposed by all the available brake control units 1, 2, 3, 4. This braking-force distribution 26 is represented by dashed lines in the representation shown in FIG. 5, a respective braking force $F_1$, $F_2$, $F_3$, $F_4$ being imposed via each of the brake units 1, 2, 3, 4.

If, for instance, high wheel slip λ is detected (typically within the range of ~10%), the relevant—that is to say, the selected—brake unit approaches its maximum of transmissible forces. If the associated overall vehicle deceleration b is ascertained (minus any gradient influences, only response pressure in the other axles), this is assumed to be the maximum partial-deceleration value $b_{1max}$, $b_{2max}$, $b_{3max}$, $b_{4max}$—that is to say, the vehicle deceleration maximally attainable by sole action of the relevant brake unit. If this is repeated for all axles and braking units, the attainable overall vehicle deceleration—that is to say, the maximum overall-deceleration value $b_{max}$—can be approximated well from the sum of the individual maximum decelerations (maximum partial-deceleration values $b_{1max}$, $b_{2max}$, $b_{3max}$, $b_{4max}$), without a full braking of the towing combination ever having been necessary (for example, FA 0.2 g, RA 0.3 g, trailer 0.2 g=0.7 g maximum deceleration capability). In practical operation, given increasing deceleration demand and upon the frictional-connection limit of an axle being reached, the braking force of at least one of the unused axles or brake units 1, 2, 3, 4 is preferentially added. This ensures the desired deceleration and does not falsify the result of the ascertainment of the attainable overall-deceleration values $b_{min}$, $b_{max}$ in any way.

So long as wheel slip below the wheel-slip limit is established in the course of the comparison 35 of the wheel slip λ with the predetermined wheel-slip limit $\lambda_{lim}$, the determination of the maximum partial-deceleration value $b_{1max}$, $b_{2max}$, $b_{3max}$, $b_{4max}$ is undertaken in a weighting path 40, by the respectively current deceleration b of the vehicle combination 24 being weighted in accordance with the detected wheel slip λ. The weighting 34 is undertaken in accordance with the distance of the detected wheel slip λ from the wheel-slip limit $\lambda_{lim}$—that is to say, as a function of the slip difference $\Delta_\lambda$ of the wheel slip λ from the wheel-slip limit $\lambda_{lim}$. In this case, a small wheel slip λ occurring is evaluated as a large distance from the frictional-connection limit, that is to say, from the predetermined wheel-slip limit $\lambda_{lim}$, accordingly as a large slip difference $\Delta_\lambda$. In this way, an improved estimation of the maximum partial-deceleration value for the respectively selected brake unit 29 can be performed by employing appropriate algorithms. When the wheel-slip limit is reached or exceeded 39, the maximum partial-deceleration value $b_{1max}$, $b_{2max}$, $b_{3max}$, $b_{4max}$ in table of values 32 is updated by the current deceleration b at this time. In the case where, during the partial brake application via a selected brake unit, no situation is reached in which the wheel slip $\lambda$ reaches the predetermined wheel-slip limit $\lambda_{lim}$, a maximum partial-deceleration value $b_{1max}$, $b_{2max}$, $b_{3max}$, $b_{4max}$ is estimated anyway via the weighting path 40.

Taking the overall-deceleration values $b_{max}$, $b_{min}$ into consideration, a determination 52 of stipulated separations A, Amin of the utility vehicle 6 or of a vehicle combination 24 from a vehicle traveling ahead is undertaken. These separations A, $A_{min}$ are distance data which are implemented by the brake control unit 16 of the respective utility vehicle 6. From the maximum overall-deceleration value $b_{max}$, which represents the greatest possible deceleration potential of the utility vehicle 6 or of the vehicle combination 24, a minimum separation $A_{min}$ from a vehicle traveling ahead is determined, which is to be adhered to in any case during travel, for instance in the platoon, in order reliably to avoid a rear-end collision.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1. First brake unit
2. Second brake unit
3. Third brake unit
4. Fourth brake unit
5. Braking system
6. Utility vehicle
7. Axle
8. Axle
9. Wheel
10. Wheel brake
11. First brake circuit
12. Second brake circuit
13. Axle modulator
14. Axle modulator
15. Signal line
16. Brake control unit
17. Signal line
18. Speed sensor
19. Electrical line
20. Deceleration request
21. Brake-signal transmitter
22. Brake pedal
23. Acceleration sensor
24. Vehicle combination
25. Trailer vehicle
26. Braking-force distribution
27. Partial brake application
28. Selection
29. Selected brake unit
30. Table of values
31. Sum
32. Table of values
33. Assignment
34. Weighting
35. Comparison
36. Auxiliary braking signall
37. Concentration
38. Control line
39. Exceeding
40. Weighting path
41. Actuating system (pneumatic)
42. Brake cylinder
43. Brake lever
44. First pressure-medium store
45. Second pressure-medium store
46. Actuating system (hydraulic)
47. Hydraulic line
48. Hydraulic cylinder
49. Actuating system (electromechanical)
50. Electromechanical actuator
51. Electrical control line
52. Determination b Deceleration
$\lambda$ Wheel slip
$\lambda_{lim}$ Wheel-slip limit
$b_1$, $b_2$, $b_3$, $b_4$ Partial-deceleration value
$b_{1max}$, $b_{2max}$, $b_{3max}$, $b_{4max}$ Maximum partial-deceleration value
$b_{min}$ Minimum overall-deceleration value
$b_{max}$ Maximum overall-deceleration value
$\Delta_\lambda$ Slip difference
$F_1$, $F_2$, $F_3$, $F_4$ Braking force
$F_A$ Response force
$F_{tot}$ Overall-braking force
A Separation
$A_{min}$ Minimum separation

The invention claimed is:

1. A method for determining the overall-deceleration values, attainable by actuation of wheel brakes, of a utility vehicle or of a vehicle combination with several axles, the method comprising:
   distributing braking forces unequally to brake units with the wheel brakes of one or more axles, so as to implement a deceleration request in the course of partial brake applications;
   selecting, in each instance of a partial brake application, one of the brake units and imposing a larger braking force via this selected brake unit than via the other brake units;
   ascertaining, in each instance of a partial brake application, a current deceleration of the utility vehicle or of the vehicle combination and assigning and storing a partial-deceleration value to the respectively selected brake unit; and determining an attainable overall-deceleration value as the sum of the stored partial-deceleration values.

2. The method as claimed in claim 1, the method further comprising:

determining a maximum partial-deceleration value by detecting a respective wheel slip at the wheel brakes of the selected brake unit and comparing the respective wheel slip with a predetermined wheel-slip limit;

storing the current deceleration of the utility vehicle or of the vehicle combination as the maximum partial-deceleration value of the selected brake unit when the predetermined wheel-slip limit is reached or exceeded; and determining a maximum overall-deceleration value as the sum of the maximum partial-deceleration values of the brake units.

3. The method as claimed in claim 1, the method further comprising determining a maximum partial-deceleration value of the respective brake units by weighting the current deceleration of the utility vehicle or of the vehicle combination in accordance with the detected wheel slip.

4. The method as claimed in claim 1, the method further comprising:

selecting the brake units in succession, thereby implementing the largest braking force in the course of a partial brake application; and assigning a partial-deceleration value and/or a maximum partial-deceleration value in each instance of a partial brake application.

5. The method as claimed in claim 1, the method further comprising:

concentrating a requested overall-braking force of the utility vehicle or of the vehicle combination onto the respectively selected brake unit in accordance with the deceleration request in the course of distributing braking forces; and determining partial deceleration values of the selected brake unit.

6. The method as claimed in claim 5, wherein while concentrating the requested overall-braking force onto the selected brake unit, other brake units are not actuated or are actuated with a response force.

7. The method as claimed in claim 1, the method further comprising determining a separation of a utility vehicle or of a vehicle combination from a vehicle traveling ahead based on the overall deceleration values.

8. A braking system comprising:

at least one wheel brake per wheel of a utility vehicle or of a vehicle combination;

an electronic brake control unit for the purpose of braking-force distribution of braking forces to brake units each comprising the wheel brakes of at least one axle; and at least one sensor assigned to the brake control unit for ascertaining a current deceleration of the utility vehicle or of the vehicle combination, wherein the brake control unit is configured to distribute braking forces unequally to the brake units in the course of partial brake applications for implementing a deceleration request, to select one of the brake units for implementing a larger braking force than the other brake units, to assign the current deceleration as a partial-deceleration value to the respectively selected brake unit, and to determine an attainable overall-deceleration value as a sum of the assigned partial-deceleration values.

9. A utility vehicle or vehicle combination with the braking system as claimed in claim 8.

* * * * *